(12) United States Patent
Xiong

(10) Patent No.: US 7,996,175 B2
(45) Date of Patent: Aug. 9, 2011

(54) PCI LOAD CARD

(75) Inventor: Jin-Liang Xiong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 760 days.

(21) Appl. No.: 12/046,463

(22) Filed: Mar. 12, 2008

(65) Prior Publication Data

US 2009/0164695 A1 Jun. 25, 2009

(30) Foreign Application Priority Data

Dec. 20, 2007 (CN) .......................... 2007 1 0203285

(51) Int. Cl.
*G06F 15/00* (2006.01)
*G06F 3/00* (2006.01)

(52) U.S. Cl. ........................................ 702/117; 710/316

(58) Field of Classification Search .................. 702/117; 710/316; 327/72

See application file for complete search history.

(56) References Cited

U.S. PATENT DOCUMENTS 5,848,253 A * 12/1998 Walsh et al. .................. 710/308
6,198,642 B1 * 3/2001 Kociecki ........................ 363/37

* cited by examiner

*Primary Examiner* — Bryan Bui
(74) *Attorney, Agent, or Firm* — Frank R. Niranjan

(57) ABSTRACT

A PCI load card includes a PCI interface, an operational amplifier, at least two switches, and a controller. A terminal of each switch is connected to an input terminal of the operational amplifier and connected to a standby power pin of the PCI interface via a first resistor. The other terminals of the at least two switches are respectively connected to ground via at least two resistors. The other input terminal of the operational amplifier is grounded. An output terminal of the operational amplifier is connected to a first terminal of the controller, a second terminal of the controller is connected to a system power pin of the PCI interface, a third terminal of the controller is grounded, the power of the controller is adjusted by controlling the at least two switches.

15 Claims, 2 Drawing Sheets

PCI LOAD CARD

BACKGROUND

1. Field of the Invention

The present invention relates to a peripheral component interconnect (PCI) load card which is used for simulating PCI loads in testing stability of motherboards.

2. Description of Related Art

In motherboard manufacturing, it is necessary to test motherboard stability, for example, when load power of the motherboard is maximal, it is necessary to test whether the motherboard is stable. The load may be a central processing unit (CPU), a hard disk drive (HDD), an optical disk drive (ODD), a floppy disk drive (FDD), a PCI device, and so on.

There are two typical methods for testing motherboard stability. By one method, actual PCI devices are inserted in the corresponding slots of the motherboard. However, it is costly to use the actual PCI devices for testing. By the other method, a card simulating a PCI load is inserted into the corresponding slot of the motherboard. However, since the card has a fixed/rated power consumption, the motherboard cannot be tested under different power conditions.

What is needed, therefore, is a PCI load card with adjustable power consumption settings for simulating different PCI loads.

SUMMARY

An embodiment of a PCI load card includes a PCI interface, an operational amplifier, at least two switches, and a controller. A terminal of each switch is connected to an input terminal of the operational amplifier and connected to a standby power pin of the PCI interface via a first resistor. The other terminals of the at least two switches are respectively connected to ground via at least two resistors. The other input terminal of the operational amplifier is grounded. An output terminal of the operational amplifier is connected to a first terminal of the controller, a second terminal of the controller is connected to a system power pin of the PCI interface, a third terminal of the controller is grounded, the power of the controller is adjusted by controlling the at least two switches.

Other advantages and novel features of the present invention will become more apparent from the following detailed description of an embodiment when taken in conjunction with the accompanying drawings, in which:

DETAILED DESCRIPTION

Figure 1:
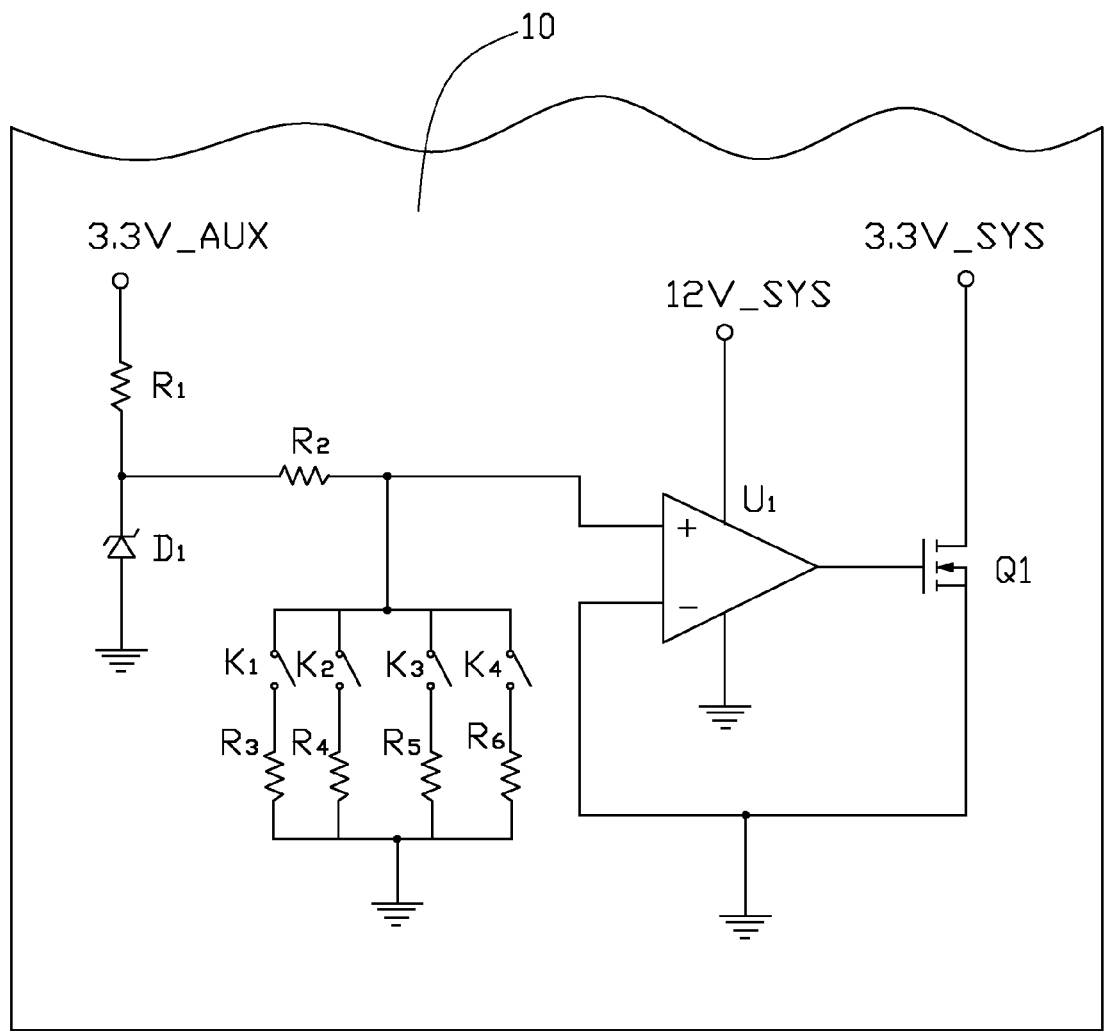
FIG. 1 is a view of a portion of a PCI load card with a circuit diagram of a 3.3V load circuit thereon in accordance with an embodiment of the present invention.
Figure 2:
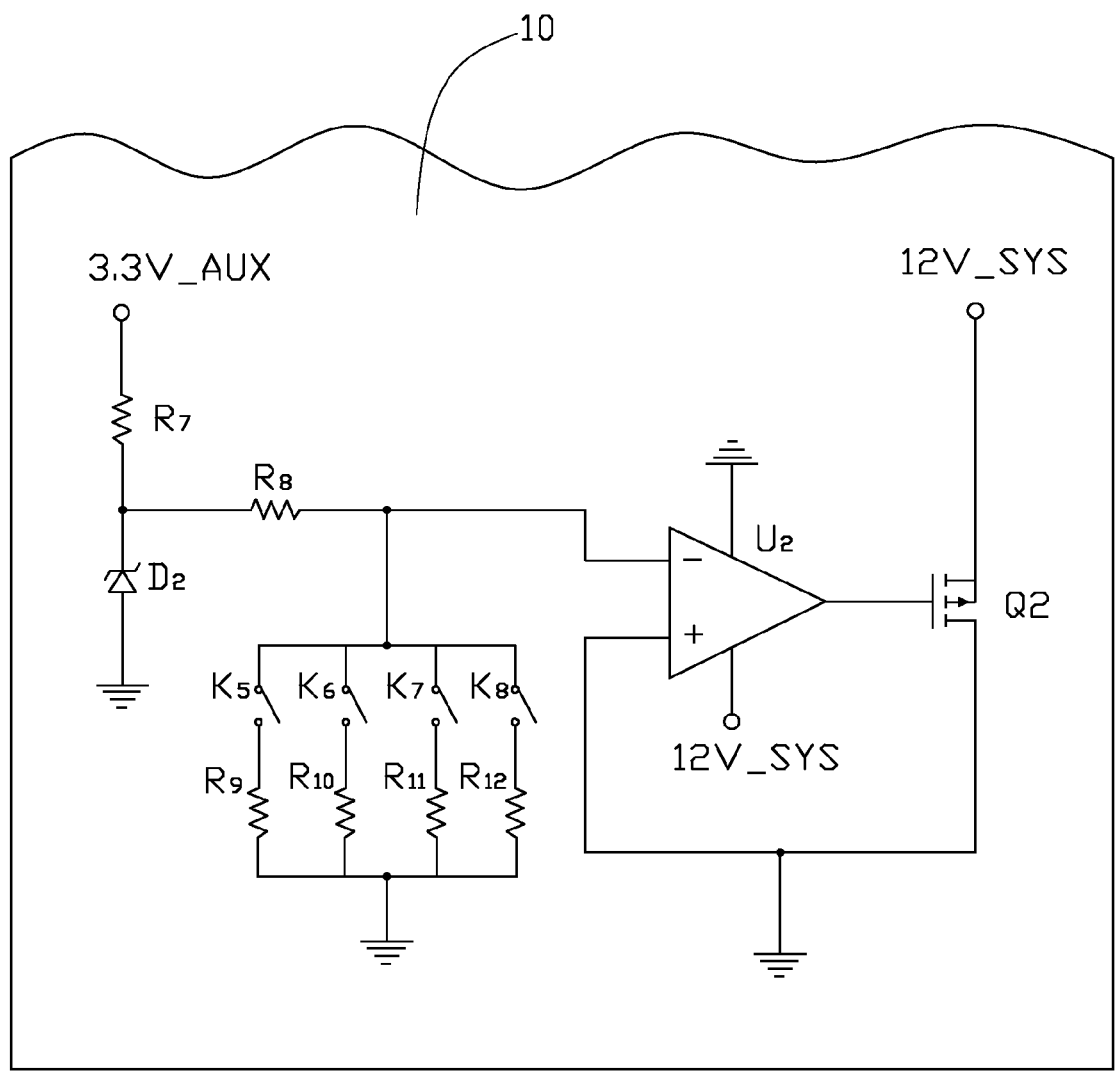
FIG. 2 is a view of another portion of the PCI load card with a circuit diagram of a 12V load circuit thereon in accordance with the embodiment of the present invention.

Referring to FIGS. 1 and 2, a PCI load card 10 in accordance with an embodiment of the present invention includes a 3.3V load circuit, a 12V load circuit, and a PCI interface (not shown).

The 3.3V load circuit includes a diode D1, six resistors R1~R6, four switches K1~K4, an operational amplifier U1, and a controller Q1. The 12V load circuit includes a diode D2, six resistors R7~R12, four switches K5~K8, an operational amplifier U2, and a controller Q2. The PCI interface includes a 3.3V standby power pin 3.3V_AUX, a 3.3V system power pin 3.3V_SYS, and a 12V system power pin 12V_SYS respectively corresponding to a 3.3V standby power pin, a 3.3V system power pin, and a 12V system power pin of a PCI slot of a motherboard of a computer to be tested. In other embodiments, more load circuits can be added according to need, such as a 5V load circuit corresponding to a 5V system power.

In this embodiment, the controller Q1 is an NMOS transistor. A terminal of each of the four switches K1~K4 is connected to the non-inverting input terminal of the operational amplifier U1. The other terminals of the four switches K1~K4 are respectively connected to ground via the resistors R3~R6. The non-inverting input terminal of the operational amplifier U1 is connected to the 3.3V standby power pin 3.3V_AUX of the PCI interface via the resistors R2 and R1 in turn. The cathode of the diode D1 is connected to a node between the resistors R1 and R2. The anode of the diode D1 is grounded. The inverting input terminal of the operational amplifier U1 is grounded and connected to the source of the controller Q1. The output terminal of the operational amplifier U1 is connected to the gate of the controller Q1. The drain of the controller Q1 is connected to the 3.3V system power pin 3.3V_SYS of the PCI interface. The positive power terminal of the operational amplifier U1 is connected to the 12V system power pin 12V_SYS of the PCI interface. The negative power terminal of the operational amplifier U1 is grounded.

In this embodiment, the controller Q2 is a PMOS transistor. A terminal of each of the four switches K5~K8 is connected to the inverting input terminal of the operational amplifier U2. The other terminals of the four switches K5~K8 are respectively connected to ground via the resistors R9~R12. The inverting input terminal of the operational amplifier U2 is connected to the 3.3V standby power pin 3.3V_AUX of the PCI interface via the resistors R8 and R7 in turn. The cathode of the diode D2 is connected to a node between the resistors R7 and R8. The anode of the diode D2 is grounded. The non-inverting input terminal of the operational amplifier U2 is grounded and connected to the drain of the controller Q2. The output terminal of the operational amplifier U2 is connected to the gate of the controller Q2. The source of the controller Q2 is connected to the 12V system power pin 12V_SYS of the PCI interface. The positive power terminal of the operational amplifier U2 is connected to the 12V system power pin 12V_SYS of the PCI interface. The negative power terminal of the operational amplifier U2 is grounded.

In this embodiment, resistances of the resistors R1~R12 are greater than 1 MΩ, thereby power at the resistors R1~R12 can be ignored. Power at the operational amplifiers U1 and U2 can also be ignored. The diodes D1 and D2 are configured for stabilizing voltage of the 3.3V standby power pin 3.3V_AUX of the PCI interface. The resistors R2 and R8 are used to divide voltage of the 3.3V standby power pin 3.3V_AUX of the PCI interface. In other embodiments, the diodes D1, D2 and the resistors R2, R8 may be deleted to save money. In other embodiments, the resistors R3~R6 and the switch K1~K4 can be replaced by a first adjustable resistor, and the resistors R9~R12 and the switch K5~K8 can be replaced by a second adjustable resistor.

In use, the PCI load card 10 is inserted into the PCI slot of the motherboard of the computer. The resistors R3~R6 and R9~R12 can be selectively connected to the circuit of the PCI load card 10 by controlling the switches K1~K8 according to need.

In the 3.3V load circuit, when the motherboard of the computer is turned on, the non-inverting input terminal of the operational amplifier U1 is at a high voltage level. The output terminal of the operational amplifier U1 is at a high voltage level, and the voltage of the output terminal of the operational amplifier U1 is greater than the voltage of the non-inverting input terminal of the operational amplifier U1. The voltage of the source of the controller Q1 is equal to the non-inverting input terminal of the operational amplifier U1. Thereby, the controller Q1 is turned on. Because power at the resistors R1~R6 and the operational amplifier U1 can be ignored, the power of the 3.3V load circuit is approximately equal to the power of the controller Q1. Thereby, users can use a multi-meter to test the resistance and voltage of the controller Q1, and then the power of the controller Q1 can be calculated via the following formula: P=U*U/R. Where "P" is the power of the controller Q1, "U" is the voltage of the controller Q1, and "R" is the resistance of the controller Q1.

Similarly, the power of the controller Q2 is also tested via the multi-meter. And the power of the 12V load circuit is approximately equal to the power of the controller Q2. The power of the PCI load card 10 can be adjusted by controlling the switches K1~K8 according to need. In other embodiments, other power levels may be obtained by adding more load circuits to the PCI load card 10.

When testing a motherboard's stability, the PCI load card 10 is inserted into a corresponding PCI slot of the motherboard. Then according to testing requirements, some of the switches are turned on, and the other switches are turned off. Thus, various power levels of the PCI load card 10 is gotten. The stability of the motherboard can be tested in various load power without connecting the actual PCI loads to the motherboard, which is very convenient.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A peripheral component interconnect (PCI) load card used for simulating PCI loads in testing stability of motherboards, the PCI load card comprising:
a PCI interface having a standby power pin and a system power pin;
an operational amplifier;
at least two switches, a terminal of each of the at least two switches connected to an input terminal of the operational amplifier and connected to the standby power pin of the PCI interface via a first resistor, the other terminals of the at least two switches respectively connected to ground via at least two resistors, the other input terminal of the operational amplifier being grounded; and
a controller having a first terminal, a second terminal, and a third terminal, an output terminal of the operational amplifier connected to the first terminal of the controller to make the controller conduct, the second terminal of the controller connected to the system power pin of the PCI interface, the third terminal of the controller being grounded, the power of the controller adjusted by controlling the at least two switches.

2. The PCI load card as claimed in claim 1, wherein the standby power pin of the PCI interface is a 3.3V standby power pin.

3. The PCI load card as claimed in claim 1, wherein the non-inverting input terminal of the operational amplifier is connected to a terminal of each of the at least two switches, the inverting input terminal of the operational amplifier is grounded.

4. The PCI load card as claimed in claim 3, wherein the controller is an NMOS transistor, and the first, second, and third terminals of the controller are respectively the gate, drain, and source of the transistor, the output terminal of the operational amplifier outputs a high voltage to gate of the transistor to make the transistor conduct.

5. The PCI load card as claimed in claim 4, wherein the system power pin of the PCI interface is a 3.3V system power pin.

6. The PCI load card as claimed in claim 1, wherein the inverting input terminal of the operational amplifier is connected to a terminal of each of the at least two switches, the non-inverting input terminal of the operational amplifier is grounded.

7. The PCI load card as claimed in claim 6, wherein the controller is a PMOS transistor, and the first, second, and third terminals of the controller are respectively the gate, source, and drain thereof, the output terminal of the operational amplifier outputs a low voltage to the gate of the transistor to make the transistor conduct.

8. The PCI load card as claimed in claim 7, wherein the system power pin of the PCI interface is a 12V system power pin.

9. The PCI load card as claimed in claim 1, further comprising a diode and a second resistor, the second resistor connected between the first resistor and the input terminal of the operational amplifier, a node between the first resistor and the second resistor connected the cathode of the diode, the anode of the diode being grounded.

10. A peripheral component interconnect (PCI) load card used for simulating PCI loads in testing stability of motherboards, the PCI load card comprising:
a PCI interface having a standby power pin, a first system power pin and a second system power pin;
a first operational amplifier;
a second operational amplifier;
a first adjustable resistor, a terminal of the first adjustable resistor connected to a non-inverting input terminal of the first operational amplifier and connected to the standby power pin of the PCI interface via a first resistor, the other terminals of the first adjustable resistor connected to ground, an inverting input terminal of the first operational amplifier being grounded;
a first controller having a first terminal, a second terminal, and a third terminal, an output terminal of the first operational amplifier connected to the first terminal of the first controller to make the first controller conduct, the second terminal of the first controller connected to the first system power pin of the PCI interface, the third terminal of the first controller being grounded, the power of the first controller adjusted by changing resistance of the first adjustable resistor;
a second adjustable resistor, a terminal of the second adjustable resistor connected to an inverting input terminal of the second operational amplifier and connected to the standby power pin of the PCI interface via a second resistor, the other terminals of the second adjustable resistor connected to ground, a non-inverting input terminal of the second operational amplifier being grounded; and
a second controller having a first terminal, a second terminal, and a third terminal, an output terminal of the second operational amplifier connected to the first terminal of the second controller to make the second controller conduct, the second terminal of the second controller connected to the second system power pin of the PCI interface, the third terminal of the second controller being grounded, the power of the second controller adjusted by changing resistance of the second adjustable resistor.

11. The PCI load card as claimed in claim 10, wherein the standby power pin of the PCI interface is a 3.3V standby power pin.

12. The PCI load card as claimed in claim 10, wherein the first controller is an NMOS transistor, and the first, second, and third terminals of the first controller are respectively the gate, drain, and source thereof, the second controller is a PMOS transistor, and the first, second, and third terminals of the second controller are respectively the gate, source, and drain thereof, the output terminal of the first operational amplifier outputs a high voltage to the gate of the NMOS transistor to make the NMOS transistor conduct, the output terminal of the operational amplifier outputs a low voltage to the gate of the PMOS transistor to make the PMOS transistor conduct.

13. The PCI load card as claimed in claim 10, wherein the first system power pin of the PCI interface is a 3.3V system power pin, the second system power pin of the PCI interface is a 12V system power pin.

14. The PCI load card as claimed in claim 10, further comprising a first diode, a second diode, a third resistor, and a fourth resistor, the third resistor connected between the first resistor and the non-inverting input terminal of the first operational amplifier, a node between the first resistor and the third resistor connected the cathode of the first diode, the anode of the first diode being grounded, the fourth resistor connected between the second resistor and the inverting input terminal of the second operational amplifier, a node between the second resistor and the fourth resistor connected the cathode of the second diode, the anode of the second diode being grounded.

15. A stability testing method of a motherboard, comprising:

providing a peripheral component interconnect (PCI) load card, the PCI load card comprising:

a PCI interface having a standby power pin and a system power pin;

an operational amplifier;

at least two switches, a terminal of each of the at least two switches connected to an input terminal of the operational amplifier and connected to the standby power pin of the PCI interface via a first resistor, the other terminals of the at least two switches respectively connected to ground via at least two resistors, the other input terminal of the operational amplifier being grounded; and a controller having a first terminal, a second terminal, and a third terminal, an output terminal of the operational amplifier connected to the first terminal of the controller to make the controller conduct, the second terminal of the controller connected to the system power pin of the PCI interface, the third terminal of the controller being grounded, the power of the controller adjusted by controlling the at least two switches;

inserting the PCI load card into a PCI slot of the motherboard via the PCI interface of the PCI load card;

using a multi-meter to test the resistance and voltage of the controller, and then the power of the controller being calculated via the following formula: P=U*U/R, where "P" is the power of the controller, "U" is the voltage of the controller, and "R" is the resistance of the controller;

selectively connecting the at least two resistors to the circuit of the PCI load card by controlling the at least two switches to adjust the power of the controller via the previous step; and testing the stability of the motherboard.

* * * * *